Dec. 20, 1955    H. W. HEMPEL    2,727,570
ELECTRICALLY ACTUATED AND CONTROLLED TAPE
MEASURING AND DISPENSING MACHINE
Filed Sept. 12, 1949    4 Sheets-Sheet 1

INVENTOR:
HERBERT W. HEMPEL,
BY Rogers & Ezell,
ATTORNEYS.

Dec. 20, 1955

H. W. HEMPEL

2,727,570

ELECTRICALLY ACTUATED AND CONTROLLED TAPE
MEASURING AND DISPENSING MACHINE

Filed Sept. 12, 1949

INVENTOR:
HERBERT W. HEMPEL,
BY Rogers & Ezell,
ATTORNEYS.

Dec. 20, 1955  H. W. HEMPEL  2,727,570
ELECTRICALLY ACTUATED AND CONTROLLED TAPE
MEASURING AND DISPENSING MACHINE
Filed Sept. 12, 1949  4 Sheets-Sheet 4

INVENTOR:
HERBERT W. HEMPEL,
BY Rogers & Ezell
ATTORNEYS.

United States Patent Office 2,727,570
Patented Dec. 20, 1955

2,727,570

ELECTRICALLY ACTUATED AND CONTROLLED TAPE MEASURING AND DISPENSING MACHINE

Herbert W. Hempel, Belleville, Ill., assignor to Marsh Stencil Machine Company, Belleville, Ill., a corporation of Illinois Application September 12, 1949, Serial No. 115,238

12 Claims. (Cl. 164—42)

The present invention relates generally to machines for dispensing gummed tape used for packaging purposes, and more particularly to an electrically actuated and controlled tape measuring and dispensing machine which is fully automatic in its operation following a manual indication of the length of tape to be measured and dispensed.

Briefly, the present invention comprises an electrically actuated and controlled gummed tape measuring and dispensing machine which accurately measures the indicated length of tape, and which feeds the measured tape uniformly over the moistening brush, thereby assuring proper wetting of the glue. The several parts of the disclosed tape measuring and dispensing machine combine to effect the present novel mechanism, and include a power driven tape feed wheel and cooperating tape pressure wheel, and a power oscillated cut-off knife which operates in timed relation with the feed wheel. Three novel electrical control systems are disclosed for effecting operation of the present novel tape measuring and dispensing machine.

An object of the present invention is to provide a novel electrical tape measuring and dispensing machine which is fully automatic in its operation of measuring and dispensing tape after the length of tape is indicated through suitable control mechanism.

Another object is to provide a novel electrical tape measuring and dispensing machine which accurately measures the tape dispensed and which moves the dispensed segment of tape uniformly over the wetting brush to assure proper wetting of the glue on the tape.

Another object is to provide a novel electrically actuated and controlled tape measuring and dispensing machine which is adapted to dispense tape accurately at a high rate of speed to effect economy in tape dispensed and in the rate of dispensing.

Another object is to provide a novel electrical tape measuring and dispensing machine which feeds the tape over and in engagement with moistening means at a substantially uniform speed to insure proper wetting of the gummed surface of the tape.

Another object is to provide a novel electrically actuated and controlled tape measuring and dispensing machine which automatically completes a tape measuring and dispensing cycle once it is initiated, and which neither overlaps operations nor effects unintended repeats.

Another object is to provide an electrically actuated and controlled tape measuring and dispensing machine which is positive in its tape measuring and tape severing actions.

Another object is to provide a novel electrically actuated and controlled tape measuring and dispensing machine in which a desired tape increment is indicated and the machine energized through a dial or push buttons, and which is simple in operation and rugged in construction.

Another object is to provide novel dial and push button control systems for electrically actuated and controlled tape measuring and dispensing machines.

The foregoing and other objects and advantages are apparent from the following description taken with the accompanying drawings, in which.

Referring to the drawings more particularly by reference numerals, 20 indicates generally an electrically actuated and controlled tape measuring and dispensing machine incorporating the concepts of the present invention. The electric control system shown in Fig. 13 and generally indicated by the letter A is shown incorporated in the machine 20 illustrated in Figs. 1 through 10 and 12, although all wiring is omitted in order to clearly present the working parts, the wiring connections being fully disclosed in Fig. 13 which is clearly described below.

Figures 4, 6, 7, 8, 9, 12:
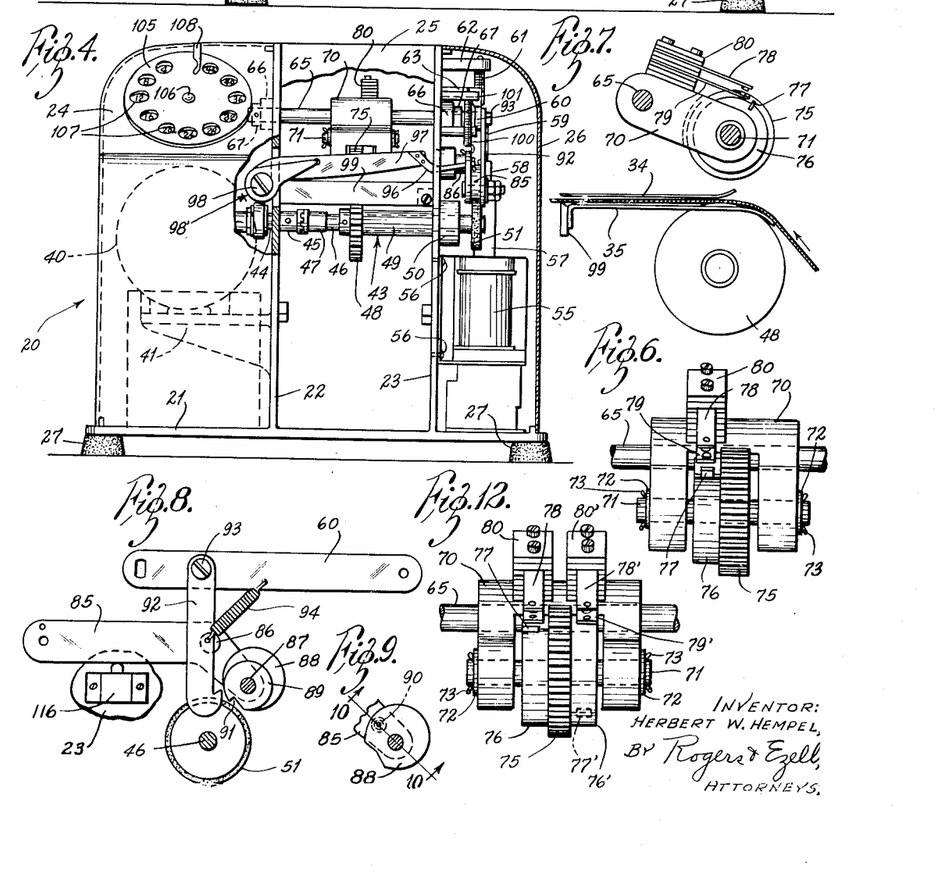
Fig. 4 is a front elevational view thereof, portions of the cover being broken away for purposes of illustrating interior details.
Fig. 6 is a fragmentary enlarged view illustrating the pressure wheel for engaging the upper surface of the tape, together with its supporting yoke and other details.
Fig. 7 is an enlarged fragmentary vertical cross-sectional view illustrating the idle or non-feed relationship of the power driven tape feed wheel and the tape pressure wheel, together with other details.
Fig. 8 is an enlarged fragmentary vertical cross-sectional view illustrating the knife pivoting bell crank and associated elements.
Fig. 9 is an enlarged fragmentary vertical cross-sectional view illustrating one of the elements of the cut-off knife actuating mechanism.
Fig. 12 is a view similar to Fig. 6, illustrating a modified construction.

The machine 20 includes a base plate 21 and integral, interior parallel vertical walls 22 and 23. Cover elements 24, 25 and 26 are provided for shielding the working mechanisms of the machine 20 which are removably secured in place by any desired means. Rubber feet 27 are secured to and support the base 21. The walls 22 and 23 define in the rear portions thereof a tape roll receptacle 28 in which is shown disposed a tape roll 29. Forwardly of the receptacle 28 and spaced therefrom is a water reservoir 30 within which is removably disposed a tape moistening brush 31. The usual tape guide defining plates 32 and 33 are provided for directing the tape toward and across the top of the brush 31. Rearwardly of the plates 32 and 33 are tape guide defining plates 34 and 35 (Fig. 7). The foregoing elements, in one form or another, are found in tape measuring and dispensing machines.

An electric motor 40 is supported outwardly of the wall 22 upon a bracket 41 welded or otherwise secured to the wall 22. A suitable reduction gear unit 42 is associated with the motor 40 in operative relation with the usual driven shaft thereof.

A composite feed shaft 43 is rotatably supported by and between the walls 22 and 23. The composite shaft 43 includes a stub shaft 44 rotatably mounted in the wall 22, one end of which is operatively connected with the reduction gear unit 42, and the other end of which supports a clutch element 45 secured thereto by a suitable setscrew. Coaxial with the stub shaft 44 is a major shaft element 46 to one end of which is secured by a suitable setscrew a clutch element 47 which engages the aforesaid clutch element 45. A tape feed wheel 48 is secured to the major shaft element 46 by a suitable setscrew, the periphery of the feed wheel 48 being serrated for feeding purposes. A sleeve 49 surrounding the major shaft element 46 spaces the feed wheel 48 from the wall 23. The other end of the major shaft element 46 has bearing support in a bearing 50 secured to the outer surface of the wall 23. A friction drive wheel 51 is secured to the reduced free end of the major shaft element 46, the periphery of which is preferably covered with vulcanized rubber, the purpose and function of the friction drive wheel 51 being set forth below.

Figures 2, 11:
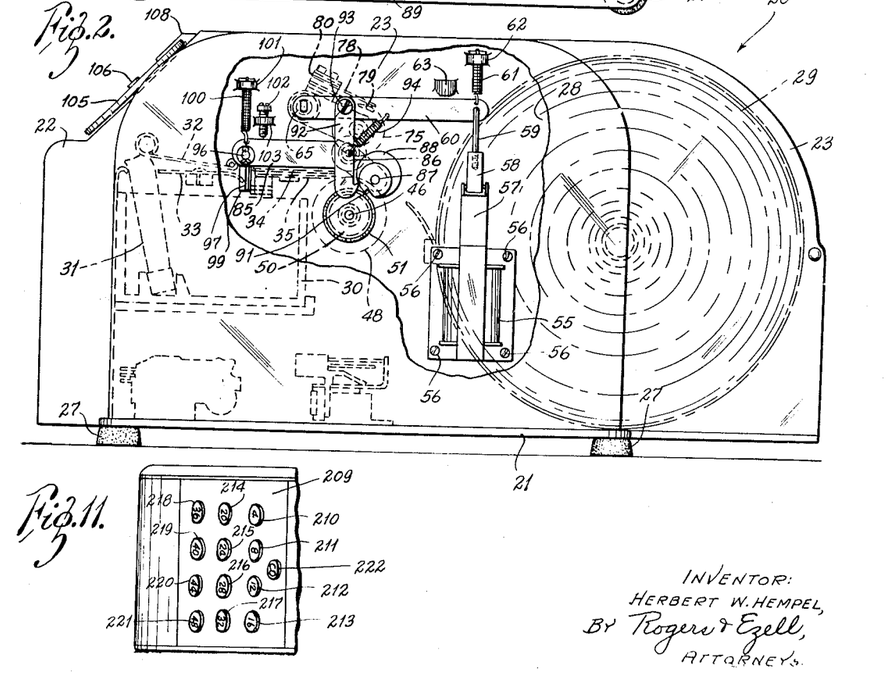
Fig. 2 is a right side elevational view thereof, a portion of the cover being broken away to illustrate the interior mechanism.
Fig. 11 is a fragmentary view of a modified control panel.
Figure 3:
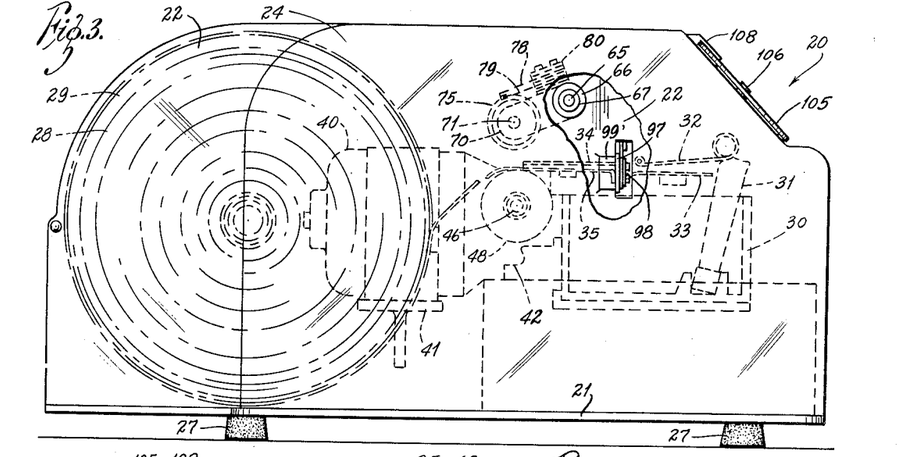
Fig. 3 is a left side elevational view thereof, a part of the cover being broken away to illustrate interior details.

A suitable solenoid 55 is mounted on the outer face of the wall 23 by suitable screws 56 in a position substantially opposite that of the motor 40 (Fig. 2.) The solenoid 55 includes a plunger member 57 to the upper end of which is pivotally connected a block 58. An inverted J member 59 threadedly engages the upper end of the block member 58, thus being adjustable vertically, and at its hook end pivotally engages the free end of a pivotally mounted link 60. A tension spring 61 has one end secured to a boss 62 welded or otherwise secured to the outer face of the wall 23, and its other end pivotally connected to the link 60 above and adjacent to the pivotal connection of the J member 59, thus biasing the link 60 counterclockwise. A stop boss 63 extends outwardly from the outer face of the wall 23 for engagement by the link 60 to limit its extreme counterclockwise position of movement. The spring 61 maintains the link 60 against the stop 63 and the plunger 57 of the solenoid 55 withdrawn, as is clearly shown in Fig. 2, when the solenoid 55 is deenergized. The link 60 is secured at its other end to one free end of a rotatable shaft 65 which extends between and through the walls 22 and 23 and is supported in bearings 66.

Figure 1:
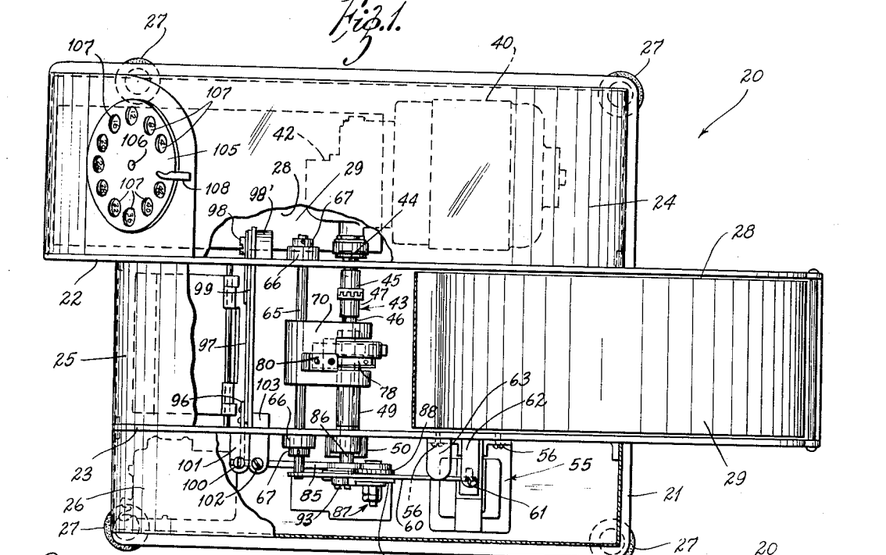
Fig. 1 is a plan view of an electrically actuated and controlled tape measuring and dispensing machine constructed in accordance with the teachings of the present invention, portions of the cover being broken away for purposes of illustrating interior details.

The rotatable shaft 65 is maintained against removal from the bearing 66 by collars 67. A yoke 70 is keyed or otherwise secured to the rotatable shaft 65 and has its legs extending downwardly and rearwardly therefrom, as is clear from Figs. 1 and 2. The legs of the yoke 70 support for free rotation a shaft 71 which is maintained against accidental removal by washers 72 and cotter pins 73 (Figs. 1, 6 and 7). A tape pressure wheel 75 having a serrated periphery is rotatably mounted on the shaft 71 between the legs of the yoke 70 (Fig. 6). A cam 76 in the form of a disc having a peripheral projection 77 of non-conducting material such as micarta, is secured to the pressure wheel 75 for rotation therewith. The pressure wheel 75 and the cam 76 may be keyed or otherwise secured to the shaft 71. Normally open resilient switch blades 78 and 79, each supporting a contact, are mounted on the base of the yoke member 70 through a laminated insulation block 80 and extend into position adjacent the periphery of the cam 76, and are adapted to be moved into closed circuit making position upon engagement of the switch blade 79 by the cam projection 77, which occurs once for each revolution of the pressure wheel 75.

The effect of the engagement of the switch blades 78 and 79 is more particularly described below in conjunction with the description of the controlling system A.

Figure 13:
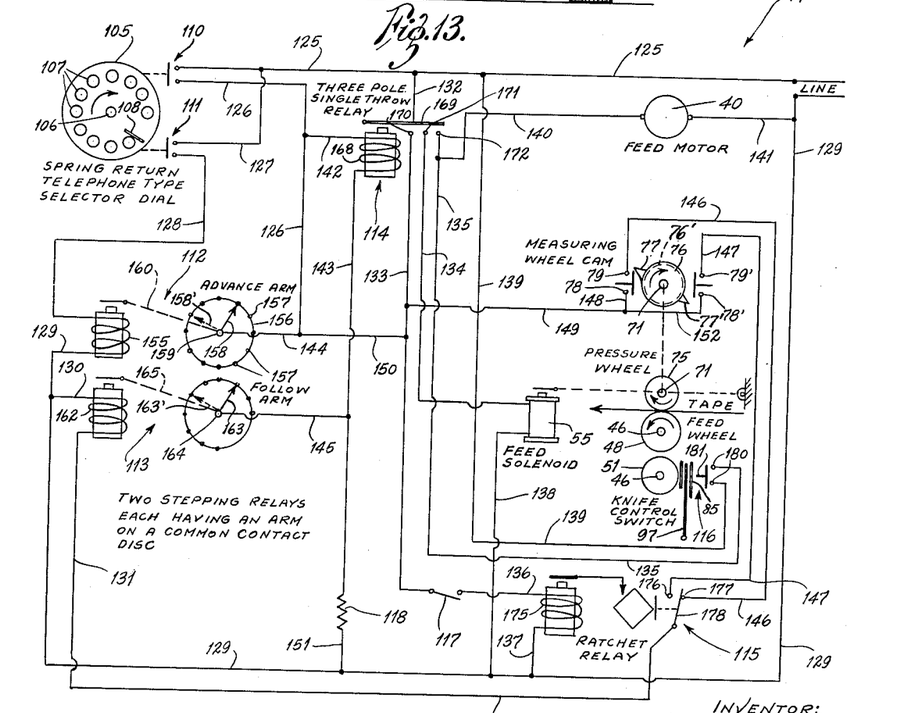
Fig. 13 is a wiring diagram of one control system for actuating the present machine.

An alternate tape pressure wheel construction is shown in Fig. 12 and is incorporated in the wiring diagram of Fig. 13. A second cam 76' is provided which is also secured to the pressure wheel 75, and which has a peripheral projection 77'. Normally open resilient switch blades 78' and 79', each supporting a contact, are mounted on the base of the yoke member 70 through a laminated insulation block 80' and extend into position adjacent the periphery of the cam 76', and are adapted to be moved into closed circuit making position upon engagement of the switch blade 79' by the cam projection 77', which occurs once for each revolution of the pressure wheel 75. The projection 77' is spaced one hundred and eighty degrees from the projection 77 for a purpose described below.

Figures 5, 10:
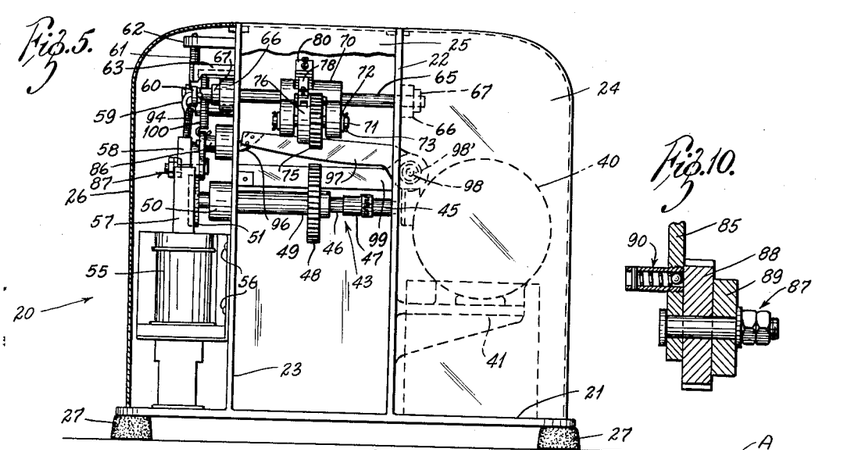
Fig. 5 is a rear elevational view thereof, portions of the cover being broken away to illustrate interior details.
Fig. 10 is a further enlarged cross-sectional view on substantially the line 10—10 of Fig. 9.

A bell crank lever 85 is pivotally mounted beneath the forward portion of the link 60 upon a stub shaft 86 extending outwardly from the outer face of the wall 23, as is clearly illustrated by Figs. 2, 4 and 8. On the free end of the rear arm of the bell crank lever 85 are mounted, for pivotal movement on a nut and bolt assembly 87, a roller 88 having a knurled periphery and a cam 89 (Fig. 10). For stopping the roller 88 in a selected position, there is provided a spring loaded ball detent unit 90 which is mounted in the rear arm of the bell crank lever 85 for engagement of the spring loaded ball thereof with a suitable indentation in the surface of the roller 88. As is clear from Figs. 8 and 9, the roller 88 is mounted off center from the nut and bolt assembly 87 and is cut away at one side. The cam 89 includes a shouldered notch 91 which is engageable by the hook end of a pawl 92 pivotally connected by a screw 93 to the link 60. A tension spring 94, secured to the link 60 and to the pawl 92 as shown in Fig. 8, biases the pawl 92 into engagement with the periphery of the cam 89. The forward end of the bell crank lever 85 pivotally receives in a suitable aperture the free end of an extension member 96 which is secured to the free end of a tape severing pivotally mounted knife blade 97 (Figs. 1, 2 and 4). The knife blade 97 is pivotally mounted at 98 upon a boss 98' welded or otherwise secured to the outer face of the wall 22. The movable knife blade 97 cooperates with a fixed blade 99 secured to and between the walls 22 and 23. A tension spring 100 biases the movable knife blade 97 into the open position shown in Fig. 4 against an adjustable stop 102 threadedly mounted in a boss 103 extending from the wall 23, said spring 100 having its upper end secured to a boss 101 welded or otherwise secured to the outer face of the wall 23 and its lower end engaging a suitable opening at the outer end of the forward arm of the bell crank lever 85.

Referring to Fig. 13, there is shown diagrammatically the above-mentioned electrical control system A. The control system A includes a spring return telephone type selector dial 105, which, as shown in Fig. 1, is conveniently mounted exteriorly of the cover element 24 on a suitable shaft 106. The dial 105 includes a selected number of finger openings 107, eleven being shown by way of illustration. When the dial 105 is at rest, a predetermined number is exposed through each opening 107, said numbers being located upon a suitable fixed disc or the like disposed behind the dial 105, the numbers 4, 8, 12, etc., through 42 being shown, the numbers indicating inches of tape to be dispensed. A finger stop 108 is secured to the cover element 24. The selector dial 105 is part of a standard unit which may be purchased on the open market and which includes two switches 110 and 111. During the spring return rotation of the selector dial 105, the switch 110 remains continuously closed while the switch 111 makes momentary contact for each return step of the selector dial 105, each opening comprising a step.

Also included in the control system A are two stepping relays 112 and 113, a three-pole single throw relay 114, a double throw single-pole ratchet relay 115, a tape cut-off knife control switch 116, a manual on and off switch 117, a resistance 118, the feed solenoid 55, the motor 40, the switch blades 78, 79 and 78', 79', the circuit making and breaking cams 76 and 76' with their respective projections 77 and 77', and the necessary leads 125 through 152 which interconnect the several elements and tap the power line.

The stepping relay 112 includes a coil 155 which is connected to one contact of the switch 111 by the lead 128 and to line by the lead 129. Also included is a disc 156 of insulative material which has a plurality of angularly disposed contacts 157 extending across the periphery thereof and a wiper arm 158 pivoted for rotation to a contact post 159 secured to the disc 156 centrally thereof. The relay 112 is of standard construction and may be purchased on the open market. The broken line 160 indicates diagrammatically the usual mechanical elements by which the wiper arm 158 is advanced one contact position every time the coil 155 is energized. Leads 144 and 126 connect the contact post 159 on which the wiper arm 158 is mounted with one contact of the switch 110 for a purpose mentioned below.

The stepping relay 113, while functioning independently, is formed jointly with the stepping relay 112 to form a combined unit. The stepping relay 113 includes a coil 162 which is connected into the lead 129 by a lead 130 and to the movable switch arm of the ratchet relay 115 more particularly referred to below. A wiper arm 163 mounted for rotation on a contact post 164, which is secured to the other side of the disc 156 and is insulated from the contact post 159, is associated with the coil 162. The wiper arm 163 engages the other ends of the contact 157 above-mentioned in connection with the wiper arm 158. The broken line 165 indicates diagrammatically the usual mechanical elements by which the wiper arm 163 is advanced one contact position every time the coil 162 is energized. The lead 145 connects the contact post 164 to the lead 143. When the system is inactive, the wiper arms 158 and 163 are in engagement with the same contact, as is more particularly described below.

The three-pole single throw relay 114 is of standard form and includes a coil 168, a movable conductive blade 169 and three poles or stationary contacts 170, 171 and 172. The lead 142 connects one side of the coil 168 into the lead 126 and the lead 143 connects the other side thereof into the lead 129 through the resistance 118 and the lead 151. The lead 132 connects the movable blade 169 with the lead 125 and leads 133, 134 and 135 are connected to the poles 170, 171 and 172, respectively.

The double throw single-pole ratchet relay 115 is of standard construction and includes a coil 175, one side of which is connected to the stationary contact of the on and off switch 117 by a lead 136, and the other side of which is connected by the lead 137 into the lead 129. Two stationary contacts 176 and 177 and a movable contact blade 178 are provided. The contact 176 is connected by the lead 147 to the switch blade 79' and the other contact 177 is connected by the lead 146 to the switch blade 79. As mentioned above, the lead 131 is connected to the movable blade 178. As is manifest, the manual on and off switch 117 determines whether or not the ratchet relay 115 is in or out of the operating circuit. When in the operating circuit, the ratchet relay 115 changes polarity each cycle of relay operation to throw the blade 178 back and forth between the contacts 176 and 177, thereby determining which of the switch blades 79' and 78 is effective for the particular cycle. It is to be noted that the ratchet relay 115 is not employed in a particular machine 20 which uses a single cam 76 and one pair of switch blades 78 and 79 (Fig. 6).

The tape cut-off knife control switch 116 is automatically actuated by the knife linkage at the start of the cut-off action and includes a pair of contacts 180 and a bridge 181, the bridge normally being out of bridging engagement with the contacts 180. The lead 139 connects one contact 180 with the lead 125 and the other contact 180 is connected by the lead 135 to the lead 140 which is connected to one side of the motor 40. Hence, the motor 40 is energized at any time the bridge 181 closes the contacts 180.

*Operation*

When the machine 20 incorporating the electrical control system A is at rest, the selector dial 105 is in the position shown in Fig. 1, the knife blade 97 is spring raised to the position shown in Fig. 4, the solenoid 55 and the pressure wheel 75, together with the connecting parts, are in the positions shown in Figs. 2 and 8, the switches 110 and 111 are open, the motor 40 is deenergized, the relays 112, 113, 114 and 115 are deenergized, the wiper arms 158 and 163 of the relays 112 and 113 are in opposed relation and in engagement with the same contact, and the other elements of the present construction are similarly in non-operating positions.

Since the numbers visible through the openings 107 are divisible by 4 and begin with the number 4, the pressure wheel 75 has a circumference of four inches inasmuch as a tape increment is determined by the circumference of this pressure wheel 75. For different length tape increments, it is but necessary to change the pressure wheel 75.

Assuming that a twelve inch tape increment is desired, a finger, pencil, or the like, is inserted in the opening 107 through which the number 12 is visible, and the selector dial 105 is rotated clockwise until the finger or the like strikes the stop 103, whereupon the selector dial 105 is released for spring return to the rest position shown in Fig. 1. As the selector dial 105 begins its spring return to rest position, the switch 110 is mechanically closed and it remains closed until the selector dial 105 reaches its position of rest, whereupon it is opened. The switch 111 is closed momentarily as the selector dial 105 begins its return and is momentarily closed as each four inch station passes the initiation point. Hence, the switch 111, in the present example, will be closed momentarily three times. Closing of the switch 110 energizes the coil 168 of the relay 114, current flowing from line to lead 125, the closed switch 110, the lead 126, the lead 142, the coil 168, the lead 143, the resistance 118, the lead 151, and the lead 129 back to line. When the switch 110 opens at the home position of the dial 105, the coil 168 remains energized through the circuit from line through the lead 125, the lead 132, the movable blade 169, the contact 170, the leads 133, 150, 126 and 142, the coil 168, the lead 143, the resistance 118, and the leads 151 and 129 back to the other side of the line. Energization of the coil 168 closes the movable blade 169 with the three poles 170, 171 and 172, whereupon both the motor 40 and the solenoid 55 are energized. Current reaches the motor 40 from line through the lead 125, the lead 132, the blade 169, the pole 172, the lead 135, the lead 140, the motor 40, the lead 141, and the lead 129 back to the other side of the line. Current flows to the solenoid 55 from line through the lead 125, the lead 132, the blade 169, the pole 171, the lead 134, the solenoid 55, the lead 138, the lead 129, and back to the other side of the line.

Energization of the motor 40 effects rotation of the feed wheel 48 and energization of the solenoid 55 effects a withdrawal of the plunger member 57 thereof against the force of the tension spring 61 to pivot the link 60 clockwise. Clockwise movement of the link 60, in turn, effects clockwise pivotal movement of the yoke 70 and the pressure wheel 75 rotatably supported thereby. Tape from the roll 29 has been previously fed across the feed wheel 48 by hand or in previous operations and cut off at the knife 97. The pressure wheel 75 is moved into contact with the tape, pressing it against the feed wheel 48. In the present illustration, the pressure wheel 75 will make three full revolutions in feeding twelve inches of tape beyond the knife and across the moistening brush 31.

Each contact of the switch 111 energizes the coil 155 which advances the wiper arm 158 one contact position. Hence, in the present illustration, the coil 155 will be energized three times to advance the wiper arm 158 three contact positions, this end position being indicated by the dotted arrow 158'. Current flows in this circuit from line through the lead 125, the lead 127, the switch 111, the lead 128, the coil 155, the lead 129 and back to the other side of the line.

The relay 113 is controlled by the switch blades 78, 79 or 78', 79', the active pair being determined by the position of the movable switch blade 178 of the ratchet relay 115. In the present illustration, it is assumed that the manual on and off switch 117 is open as shown in Fig. 13, and, hence, the switch blades 78 and 79 are active. The cam 76, through its projection 77, closes the switch blades 78 and 79 momentarily at the completion of each revolution of the pressure wheel 75. Hence, the coil 162 of the relay 113 will be energized momentarily at the end of each revolution of the pressure wheel 75 to step the wiper arm 163 one contact, the wiper arm 163 moving in the same direction as the wiper arm 158 and at least a fraction of a position behind it so that the two do not engage the same contact until the complete measuring operation is through, which is assured as the dial 105, in its return, makes its contacts faster than the measuring wheel 75 rotates. The circuit for thus energizing the relay 113 is from line to the lead 125, the lead 132, the movable blade 169, the pole 170, the lead 133, the lead 149, the lead 148, the switch blades 78 and 79, the lead 146, the fixed contact 177, the movable blade 178, the lead 131, the coil 162, the lead 130, the lead 129 and back to the other side of the line.

As the pressure wheel 75 completes its third revolution and the switch blades 78 and 79 are momentarily closed to bring the wiper arm 163 to the third contact position as indicated by the dotted arrow 163' in Fig. 13, at which point the wiper arm 163 engages the same contact as the wiper arm 158, the coil 168 of the relay 114 is short circuited, whereupon the relay 114 is opened, thereby deenergizing the motor 40 and the feed solenoid 55. The short circuit is from line through the lead 125, the lead 132, the blade 169, the contact 170, the lead 133, the lead 150, the lead 144, the contact post 159, the wiper arm 158, the contact 157 engaged by it, the wiper arm 163 which is in engagement with the same contact 157, the contact post 164, the lead 145, the lead 143, the resistance 118, the lead 151, the lead 129, and back to the other side of the line.

As the solenoid 55 is deenergized, the spring 61 moves the link counterclockwise back to the position shown in Fig. 2. Thereupon, the pressure wheel 75 is released from engagement with the tape, and, hence, tape feeding stops. However, when the link 60 is in its lowered position, as aforesaid, the pawl 92 is biased by the spring 94 against the cam 89 so that the hook portion thereof engages the shouldered notch 91 of the cam 89. Hence, as the link 60 is returned to its position of Fig. 2, the pawl 92 will rotate the cam 89 a predetermined amount. The cam 89 is fixed to the eccentrically mounted roller 88 so that clockwise rotation of the cam 89 effects the same rotation of the roller 88 which is thereby moved into engagement with the friction drive wheel 51 mounted on the major shaft element 46.

The coasting power of the motor 40 is adequate to pivot the bell crank lever 85 counterclockwise through engagement of the friction drive wheel 51 with the roller 88 to lower the pivotally mounted knife blade 97 to sever the measured segment of tape. However, the switch 116 is provided to reenergize the motor 40 as the link 60 begins its return to rest travel. In its initial stage of movement, the bell crank lever 85 engages the switch 116 to close the bridge 181 across the contacts 180. Energizing current follows a circuit from line through the lead 125, the lead 139, the closed switch 116, the lead 135, the lead 140, the motor 40, the lead 141, the lead 129, and back to the other side of line. As the eccentrically mounted roller 88 completes its engagement with the friction drive wheel 51, it is stopped in the position shown in Figs. 9 and 10 by the spring-pressed ball detent 90, and the bell crank lever 85 is returned to the position shown in Figs. 2 and 8 against the stop 102 by the tension spring 100. As is clear from Fig. 9, the roller 88 is predeterminately cut away in order not to overdrive the bell crank lever 85 and the knife blade 97. Thus, the bell crank lever 85 makes but a single oscillation, and the reenergizing switch 116 is only momentarily actuated.

When the manually operated on and off switch 117 is closed, the relay ratchet 115 is connected into the general circuit. When the three-pole relay 114 is closed, as set forth above, current will flow through the coil 175 from line through the lead 125, the lead 132, the movable blade 169, the pole 170, the lead 133, the closed switch 117, the lead 136, the coil 175, the lead 137, the lead 129, and back to the other side of line. Hence, the coil 175 will be energized each time the selector dial 105 is operated to measure and dispense a tape increment. Each time the coil 175 is actuated, the ratchet relay 115 changes polarity, that is, the movable switch blade 178 is drawn from the stationary contact which it engages prior to energization of the coil 175 to engagement with the other stationary contact. For example, with the on and off switch 117 closed before the selector dial 105 is rotated to measure and dispense a tape increment (Fig. 13), upon closing of the relay 114 and energization of the coil 175 the movable contact 178 will be thrown into engagement with the stationary contact 176, thereby taking the switch blades 78 and 79 out of the active circuit, and throwing the switch blades 78' and 79' into the active circuit. The switch blades 78' and 79' will be momentarily closed by the projection 77' of the cam 76' after the pressure wheel 75 and the cam 76' have been rotated through one-half revolution, as is clear from the drawing. Hence, as long as the switch 117 remains closed, the machine 20 will dispense tape segments or increments of two inches, six inches, ten inches, etc., up to thirty-eight inches for the machine 20 illustrated, since the relay 115 will change polarity at each tape increment selection. Manifestly, the double cam construction shown in Figs. 12 and 13 must be employed for use of the ratchet relay 115 and the manual switch 117.

Figure 14:
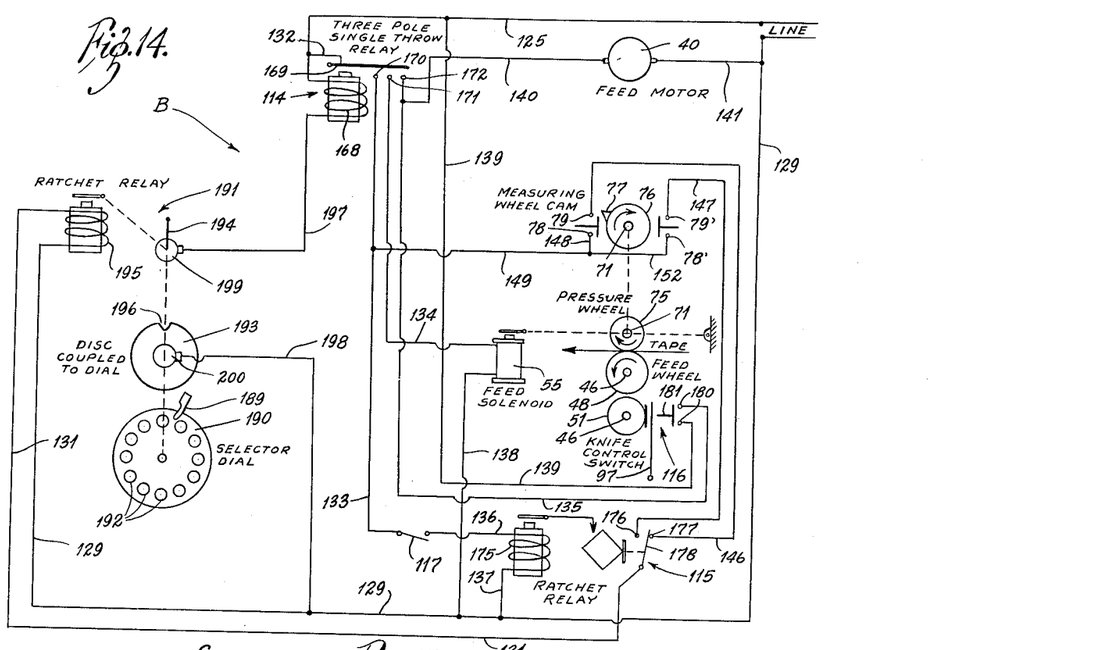
Fig. 14 is a wiring diagram of a modified control system.

In Fig. 14 is diagrammatically illustrated an electrical control system B for the machine 20, which is a modification of the control system A. Basically, the control system B differs from the control system A in that the selector dial 105 and its component parts, including the switches 110 and 111 and the combined stepping relays 112 and 113 of the latter are replaced in the former by a selector dial 190 and a ratchet relay 191.

The selector dial 190 is shown as including twelve finger openings 192, and it is mechanically coupled to, but insulated from, a conductive disc 193 by means of a suitable shaft. A finger stop 189 is provided which serves as a measuring index. A conductive wiper arm 194 is mounted for rotation on a contact post 199 adjacent one side of the disc 193 and on a common axis therewith for engagement adjacent the periphery and for movement into a circuit breaking notch 196 in the disc 193 for breaking contact. The relay 191 includes a coil 195 which effects rotary movement of the wiper arm 194 an angular distance equal to that between finger openings each time the coil 195 is energized through the usual ratchet mechanism. At the hub of the disc 193 is a contact post 200. Leads 197 and 198 are connected to the contact posts 199 and 200, respectively. The disc 193 and the wiper arm 194 are insulated from each other at the common mounting axis.

The other elements and connections of the control system B are the same as those of the control system A, and, hence, the same reference numerals have been applied.

The selector dial 190 is not of the spring return type, but remains in the position to which it is advanced in the selection of the length of tape to be measured and dispensed by the machine 20, the tape increment members being on a fixed disc beneath the selector dial 190. For the present illustration, it is assumed that the machine 20 is equipped with a four inch circumference pressure wheel 75. Assuming that a sixteen inch increment of tape is desired, the ratchet relay 115 being out of the circuit due to the open position of the on and off switch 117, the selector dial 190 is rotated through four positions, whereupon it and the connected disc 193 will be retained in this advanced position by a suitable spring loaded detent or ratchet (not shown). As the disc 193 is moved forwardly with the selector dial 190, the home position notch 196 will be moved forwardly from the end of the wiper arm 194 so that the wiper arm 194 comes into continuous circuit making contact with the disc 193. As the head of the wiper arm 194 leaves the notch 196 and engages the disc 193, the circuit is completed through the coil 168 of the relay 114 which energizes the several components of the machine 20 in the manner set forth above in connection with the description of the control system A. The circuit is closed between the leads 197 and 198 through the arm 194, the disc 193, and the contact posts 199 and 200. At each revolution of the pressure wheel 75, the cam 76, through its projection 77, closes the contact blades 78 and 79 to momentarily energize the coil 195 of the ratchet relay 191. In dispensing the example sixteen inch tape increment, the coil 195 will be momentarily energized four times, the last energization moving the wiper arm 194 into the home notch 196, thereby deenergizing the system B to open the relay 114, deenergizing the motor 40 and the solenoid 55. The tape measuring and dispensing operation is the same here as described above in conjunction with the control system A, including the reenergizing of the motor 40 during the cutting stroke. With the switch 117 closed, the ratchet switch 115 functions as described above.

Figure 15:
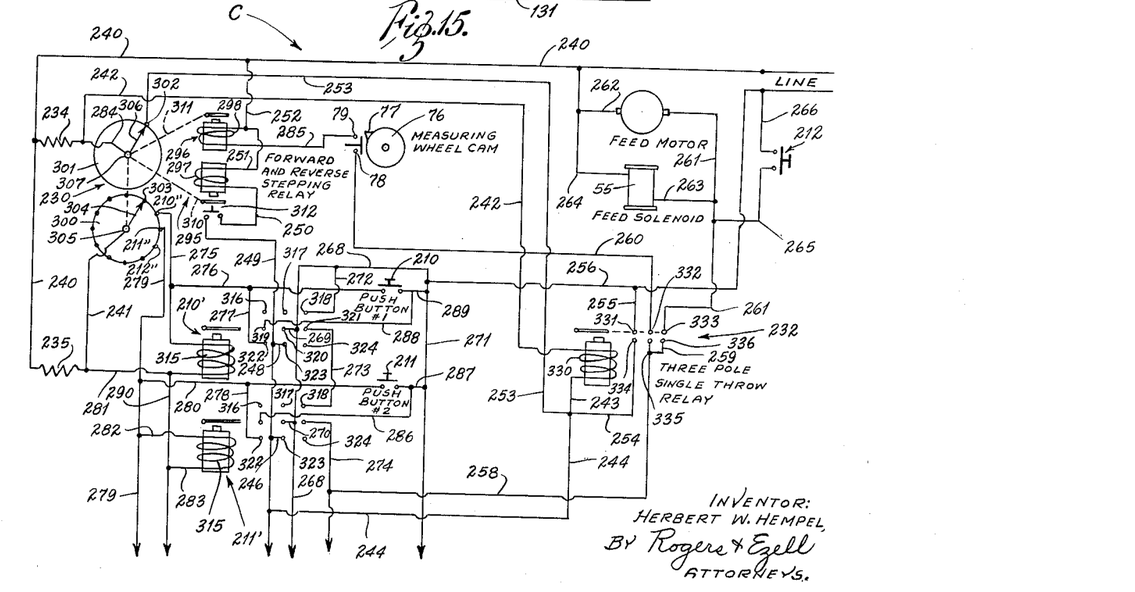
Fig. 15 is a wiring diagram of another modified control system for the present machine.

In Fig. 15, there is disclosed a further modified electrical control system C for effecting energization of the motor 40 and solenoid 55 which function in the manner set forth above to cause the several above-described parts of the machine 20 to measure, feed and cut off tape increments. The control system C is of the push button type, and may employ any selected number of push buttons, twelve push buttons 210—221 being shown in Fig. 11 mounted on a panel 209 secured to the cover element 24. A continuously operating or random button 222 is also shown mounted on the panel 209. In Fig. 15, the circuits for two of the push buttons are disclosed, the circuits for the other push buttons being the same.

The electrical control system C also includes a stepping switch 230, a double throw three-pole relay 210', 211', etc., for each push button 210, 211, etc., respectively, a three-pole single throw relay 232, the switch blades 78 and 79, the switches of the push buttons 210, 211, etc., the switch of the continuous operation push button 222, resistances 234 and 235, and the necessary leads 240 through 290. The stepping switch 230 includes a forward stepping relay 295 and a reverse stepping relay 296 of standard construction which include coils 297 and 298, respectively. Two spaced coaxially mounted discs 300 and 301 are provided, the former of which has peripheral contacts 210", 211", 212", etc., to the number of push buttons employed with the particular machine 20, and the latter of which has a single contact 302. The contact 302 may be designated an index or home contact, the disc 300 having a non-conductive index or home position 303 exactly corresponding to the contact 302 in relation to location at the periphery of the disc. A wiper arm 304 is secured to a shaft extending through the center of the disc 300 and is disposed for engagement with the contacts 210", 211", etc., and the index position 303. The wiper arm 304 is suitably mounted on a contact post 305 to which is connected the lead 241. A wiper arm 306 is secured to the same shaft to which the wiper arm 304 is secured, the shaft extending through the disc 301. The wiper arm 306 is mounted on a contact post 307 to which the lead 284 is connected. The wiper arms 304 and 306 are secured to the shaft in parallel relation so that they engage the respective index positions 303 and 302, respectively, at the same time. The forward and reverse stepping relays 295 and 296 are mechanically connected to the shaft mounting the wiper arms 304 and 306 by the usual pawl and linkage construction as is indicated by the respective broken lines 310 and 311 for respectively stepping the wiper arms 304 and 306 simultaneously clockwise and counterclockwise. A switch 312 is provided in the circuit through the coil 297 which is normally closed, but which is mechanically opened each time the coil 297 is energized in the stepping action.

Each double throw three-pole relay 210', 211', etc., includes a coil 315 and a switch having upper stationary contacts 316, 317 and 318, movable or throw contacts 319, 320, and 321, and lower stationary contacts 322, 323 and 324. The contacts are connected into the system, as is clearly shown in Fig. 15, several of the contacts being unused, but required in the standard switch for balance.

The three-pole single throw relay 232 includes a coil 330 and a switch having movable or throw contacts 331, 332 and 333, and stationary contacts 334, 335 and 336. The several contacts 331 through 336 are insulated from each other and are connected as clearly shown in Fig. 15.

As illustrated, the push button electrical control system C is set up for measuring and dispensing tape increments in multiples of four, which means that the measuring and pressure wheel 75 is four inches in circumference. Manifestly, tape increments of other lengths may be measured and dispensed by changing the measuring and tape pressure wheel 75, as is indicated above. Random or continuous dispensing of tape is effected through the use of the continuous operation button 222 and its associated switch.

Assuming that an eight inch tape increment is to be measured and dispensed by the machine 20 incorporating the control system C, push button 211 is depressed to bridge the contacts of its associated switch, a momentary bridging being sufficient to set the machine 20 into operation to effect the desired cycle. The coil 315 of the relay 211' is energized, the circuit being established from line through the lead 240, the resistance 235, the lead 281, the lead 290, the lead 283, the coil 315 of the relay 211', the lead 282, the lead 279, the lead 280, the closed switch of the push button 211, the lead 287, the lead 271, the lead 256, and back to he other side of the line. The movable contacts 319, 320, and 321, which are in engagement with the upper stationary contacts 316, 317, 318, respectively, when the coil 315 is deenergized, are thrown into engagement with the lower stationary contacts 322, 323 and 324, respectively, thereby establishing a holding circuit for the coil 315 through the engaged contacts 319 and 322. The holding circuit is the same as just traced except the lead 286 and the lead 278 connected to the contacts 319 and 322, respectively, carry the current around the opened switch of the push button 211, as is manifest from Fig. 15. Hence, a momentary closing of the push button 211 is sufficient to set the control system C in operation to effect measuring and dispensing of the selected tape increment. Engagement of the contacts 320 and 323 closes the circuit through the normally closed switch 312 and the coil 297 of the forward stepping relay 295, the circuit being traced from line through the lead 240, the lead 252, the lead 251, the coil 297, the lead 250, the closed switch 312, the lead 249, the lead 246, the contact 323, the contact 320, the lead 270, the lead 268, the lead 256, and back to the other side of the line. Energization of the coil 297 effects mechanical movement of the wiper arms 304 and 306 one step. However, as the wiper arms 304 and 306 are mechanically moved forward one step, the switch 312 is mechanically opened by movement of the shaft carrying the wiper arms 304 and 306, thereby deenergizing the coil 297. The switch 312 immediately returns to its normally closed position through spring action or the like, whereupon the coil 297 is again energized to effect mechanically another step of the wiper arms 304 and 306. This action is repeated until the wiper arm 304 engages contact 211", which, in the instant case, requires only two energizations of the coil 297.

Meanwhile, the relay 232 is energized through engagement of the same two contacts 320 and 323, current flowing through the coil 330 thereof by the circuit from line through the lead 240, the resistance 234, the lead 242, the coil 330, the lead 243, the lead 244, the lead 249, the lead 246, the contact 323, the contact 320, the lead 270, the lead 268, and the lead 256, and back to the other side of the line. Energization of the coil 330 effects closing of the contacts 331, 332 and 333 with the stationary contacts 334, 335 and 336, respectively, thereby preparing a circuit for subsequent energization of the motor 40 and the solenoid 55. A holding circuit for the coil 330 is established through engagement of the contacts 331 and 334, the circuit being traced from line through the lead 240, the resistance 234, the lead 242, the coil 330, the lead 243, the lead 254, the contact 334, the contact 331, the lead 255, the lead 256, and back to the other side of the line.

When the wiper arm 304 reaches the contact 211", the coil 315 of the controlling relay 211' is short circuited without damage to the equipment through the resistance 235, the path of the short circuit being from line through the lead 240, the resistance 235, the lead 241, the contact post 305, the wiper arm 304, the contact 211", the lead 279, the lead 280, the lead 278, the contact 322, the contact 319, the lead 286, the lead 287, the lead 271, the lead 256, and back to the other side of the line. The coil 315 is deenergized, whereupon the movable contacts 319, 320 and 321 of the relay 211' are thrown back into engagement with the upper stationary contacts 316, 317 and 318, respectively, thereby opening the circuit through the switch 312 and the forward stepping relay 295. The contacts 316 and 317 are not connected into the present system, as is manifest from Fig. 15, but the engagement of the contact 321 with the stationary contact 318 now closes the circuit through the motor 40 and the feed solenoid 55, since the previous action has set up the contacts of the relay 232 for this result, as is described above. The circuit through the motor 40 is from line through the lead 240, the lead 264, the lead 262, the motor 40, the lead 261, the contact 333, the contact 336, the lead 259, the lead 258, the lead 274, the contacts 321 and 318 of the relay 211', the lead 273, the contacts 321 and 318 of the relay 210', the lead 272, the lead 268, and the lead 256, and back to the other side of the line. The circuit through the solenoid 55 is the same, except that the current passes through the solenoid 55 by the lead 264 and thence from the solenoid to the lead 261 by the lead 263.

Energization of the motor 40 and the solenoid 55 effects the same mechanical actions in regard to the tape measuring and pressure wheel 75 and the feed wheel 48 as is set out above in connection with the description of the system A. Hence, an eight inch increment of tape is measured between the feed wheel 48 and the pressure and measuring wheel 75, the measuring wheel 75 making two revolutions which effect two revolutions of the cam wheel 76. At the completion of each revolution, the projection 77 on the cam 76 closes the switch blades 79 and 78 momentarily. Closing engagement of the conductive blades 79 and 78 closes a circuit through the coil 298 of the reverse stepping relay 296, the circuit being the same as detailed for the motor 40, except current flows from the lead 240 by the lead 252 through the coil 298, the lead 285, the conductive switch blades 79 and 78, the lead 260, and the closed contacts 332 and 335 to the lead 258. Each time the coil 298 is energized, the reverse stepping relay 296 moves the wiper blades 304 and 306 counterclockwise one position. In the present example, the coil 298 will be energized twice, and, hence, the wiper arm 304 will be mechanically moved counterclockwise from the contact 211" to the neutral index position 303 and the wiper arm 306 will be mechanically returned at the same time to the contact index position 302. As the wiper arm 306 reaches the contact 302, a short circuit is established through the resistance 234 without injury to the equipment, thereby deenergizing the relay 232, the short circuit being from line through the lead 240, the resistance 234, the lead 284, the contact post 307, the wiper arm 306, the contact 302, the lead 253, the lead 254, the contacts 334 and 331 of the relay 232, the lead 255, the lead 256, and back to the other side of the line. Deenergization of the coil 330 of the relay 232 effects mechanical breaking of the movable contacts 331, 332 and 333 from engagement with the stationary contacts 334, 335 and 336, respectively, thereby deenergizing the motor 40 and the solenoid 55. Measuring and feeding action immediately ceases, and the coasting power of the motor 40 is sufficient to effect severing action of the tape by the knife 97, which is accomplished in the same manner as is described above. Upon return of the tape severing knife 97 to its inoperative position through spring action, the machine 20 is ready for another tape measuring and feeding operation.

The electrical control system C is illustrated in Fig. 15 in conjunction with a single cam 76 and without the ratchet relay 115 and knife control switch 116 shown in Figs. 13 and 14. Manifestly, the double cam construction as illustrated in Fig. 12 in conjunction with the ratchet relay 115 and the switch 117 may be included in system C, as may the knife control switch 116.

The random button 222, when pushed inwardly to close the contacts of its switch will effect continuous tape feeding by the motor 40 until released. Closing of the switch of the random button 222 closes a simple circuit from line through the lead 240, the lead 264, the lead 262, the motor 40, the lead 261, the lead 265, the closed switch operated by the button 222, and the lead 266 back to the other side of the line. The same circuit is established through the solenoid 55, except the current passes by the lead 264 to the solenoid 55 and thence by the lead 263 to the lead 261. The mechanical closing of the contact blades 79 and 78 by the projection 77 of the cam 76 is ineffective for circuit making, since the coil 330 of the relay 232 is deenergized and the contacts are in open positions.

The applicant's electrically actuated and controlled tape measuring and dispensing machine 20 is fast and accurate. Thirty to forty inches of tape may be dispensed per second in a continuous measuring and feeding operation, the moistening of the tape being presently determinative of the speed. The tape must be adequately moistened or it will not stick to the applied package. Short tape increments may be rapidly and accurately dispensed, there being very little overrun, if any, in a particular dispensing operation, accuracy of increments being held to within a narrow margin less than one-quarter of an inch. Manifestly, the applicant has provided a machine which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. An automatic tape measuring and dispensing machine comprising, in combination, a supporting frame, automatic means for feeding a tape strip, automatically operable power means for actuating said first-mentioned means operatively connected thereto, means engageable with a tape strip for direct measurement of the same as it is fed, said measuring means being connected with said first-mentioned means and actuatable therethrough simultaneously therewith, means for selecting a tape segment to be measured and dispensed, means operatively connected to said selector means and to said power means for energizing the latter upon actuation of the former, and means for automatically rendering said power means inoperative to feed tape immediately upon completion of the feeding and measuring of the preselected tape segment.

2. An automatic tape measuring and dispensing machine comprising, in combination, a supporting frame, a tape strip feed member movably mounted on said frame, automatically operable power means for actuating said feed member operatively connected thereto, movable means for pressing a tape strip against said feed member for feeding, automatically operable means for moving said presser means, means for selecting the length of tape segment to be measured and dispensed, means for actuating said power means and said presser moving means to feed tape, means in driven engagement with the moving tape for measuring the same as it is fed, and means responsive to said tape measuring means for rendering said actuating means inoperative as measurement of the selected tape segment is completed, thereby to stop tape feeding.

3. An automatic tape measuring and dispensing machine comprising, in combination, a supporting frame, a tape strip feed roller rotatably mounted thereon, a motor on said frame, means operatively connecting said motor and feed roller for drive of the latter by the former, a tape measuring and presser roller rotatably and swingably mounted on said frame, a solenoid, linkage connecting said solenoid and said measuring and presser roller for swinging movement of the latter by the former to bring the said latter into engagement with said feed roller, a measuring cam rotatably mounted and connected to said presser roller for rotation therewith, electrical means for selecting the length of a tape segment to be measured and dispensed, electrical means for automatically energizing said motor and solenoid upon actuation of said tape selector means, and electrical means for automatically deenergizing said motor and solenoid upon completion of measurement of a selected tape segment actuatable by said cam.

4. An automatic tape measuring and dispensing machine comprising, in combination, a supporting frame, a tape strip feed roller rotatably mounted thereon, a motor on said frame, means operatively connecting said motor and feed roller for drive of the latter by the former, a tape measuring and presser roller rotatably and swingably mounted on said frame, a solenoid, linkage connecting said solenoid and said measuring and presser roller for swinging movement of the latter by the former to bring the said latter into engagement with said feed roller, a measuring cam rotatably mounted and connected to said presser roller for rotation therewith, means for operatively indicating a tape segment having a selected number of units of length to be measured and dispensed, means for decreasing the operatively indicated tape segment to be measured and dispensed a predetermined increment, means for automatically energizing said motor and solenoid upon actuation of said tape selector means, and means for automatically deenergizing said motor and solenoid upon completion of measurement of a selected tape segment actuatable by said cam.

5. An automatic tape measuring and dispensing machine comprising, in combination, a supporting frame, a tape strip feed roller rotatably mounted thereon, a motor on said frame, means operatively connecting said motor and feed roller for drive of the latter by the former, a tape measuring and presser roller rotatably and swingably mounted on said frame, a solenoid, linkage connecting said solenoid and presser roller for swinging movement of the latter by the former to bring the said latter into engagement with said feed roller, a measuring cam rotatably mounted and connected to said presser roller for rotation therewith, a knife pivotally mounted on said frame, means for connecting said knife with said motor for pivotal tape severing movement of the former by the latter, means for selecting a tape segment to be measured and dispensed, means for energizing said motor and solenoid upon actuation of said tape selector means, and means for deenergizing said motor and solenoid upon completion of measurement of a selected tape segment actuatable by said cam, said knife and motor connecting means being rendered operative to pivot said knife upon deenergization of said solenoid.

6. An automatic tape measuring and dispensing machine comprising, in combination, a supporting frame, a tape strip feed roller rotatably mounted thereon, a motor on said frame, means operatively connecting said motor and feed roller for drive of the latter by the former, a tape measuring and presser roller rotatably and swingably mounted on said frame, a solenoid, linkage connecting said solenoid and presser roller for swinging movement of the latter by the former to bring the said latter into engagement with said feed roller, a measuring cam rotatably mounted and connected to said presser roller for rotation therewith, a knife pivotally mounted on said frame, means for connecting said knife with said motor for pivotal tape severing movement of the former by the latter, means for selecting a tape segment to be measured and dispensed, means for energizing said motor and solenoid upon actuation of said tape selector means, means for deenergizing said motor and solenoid upon completion of measurement of a selected tape segment actuatable by said cam, said knife and motor connecting means being rendered operative to pivot said knife upon deenergization of said solenoid, means for reenergizing said motor immediately following deenergization thereof to effect positive pivotal movement of said knife, and means for deenergizing said motor as the tape severing stroke is completed.

7. An electrical control system for tape measuring and dispensing machines having motor driven feed means and solenoid conditioned measuring means, said control system comprising actuatable means for selecting tape lengths of predetermined increments to be measured and dispensed, means electrically connected with and energizable upon actuation of said first-mentioned means to close a motor circuit for feeding tape and a solenoid circuit for measuring tape as fed, movable means for indicating predetermined intermediate increments as a tape length is being measured and dispensed, switch means adapted to be mechanically closed and released by said third-mentioned means at each intermediate tape increment indication, and means electrically interconnecting said first-mentioned and said second-mentioned means for deenergizing the latter immediately the selected tape length is measured.

8. An electrical control system for tape measuring and dispensing machines comprising a rotatable spring return tape length selector dial, two stepping relays each including a coil, a stepping conductive wiper arm actuated thereby, and a disc with annularly disposed spaced contacts, there being one common home contact on said discs, one arm being an advance arm and the other a follow arm, a three-pole single throw relay including a coil and three stationary contacts, a motor circuit including one of said stationary contacts, a solenoid circuit including another of said stationary contacts, a rotatable measuring wheel cam, a switch engageable by said cam and adapted to be mechanically closed and released thereby upon each revolution thereof, said switch being in a circuit with the actuating coil of said follow arm and adapted to energize said coil at each closing by said cam, and a short circuit through said common home contact and around said three-pole single throw relay energizable and effective upon engagement of said home contact by both wiper arms to deenergize said three-pole single throw relay to deenergize said motor and solenoid circuits to terminate the tape measuring operation.

9. An electrical control system for tape measuring and dispensing machines comprising a rotatable spring return tape length selector dial having a rest position and a number of annularly disposed stations equally spaced therefrom, each station indicating and adapted to select a tape length which is a multiple of a predetermined base tape increment, a first switch mechanically closed by said dial upon start of its spring return and released as said dial reaches rest position, a second switch mechanically closed momentarily by said dial and then released upon start of its spring return which is repeated as said dial reaches each station on its spring return, a first stepping relay including a coil, a stepping advance conductive wiper arm, and a disc with annularly spaced contacts including a home contact engageable by said advance arm, said first relay coil and said second switch being in a common circuit, a second stepping relay including a coil, a stepping follow conductive wiper arm, and a disc with annularly spaced contacts including a home contact engageable by said follow arm, said two home contacts being electrically engaged and said two wiper arms being in a common circuit including said first switch when both engage said respective home contacts, a three-pole single throw relay including a coil and three contacts, said coil being in a circuit with said first switch, a motor circuit including one of said three contacts, a solenoid circuit including a second one of said three contacts, a rotatable measuring wheel cam, and a switch engageable by said cam and adapted to be mechanically closed and released thereby at the completion of each revolution thereof, said switch being in a circuit with said coil of said second stepping relay so each time the former is closed it effects one return step of its associated follow wiper arm.

10. An automatic tape measuring and dispensing machine comprising, in combination, a supporting frame, tape strip severing mechanism, tape feeding mechanism, tape measuring mechanism, electrically powered means for actuating said tape strip severing mechanism and said tape feeding and measuring mechanisms, and electrical control mechanism for energizing said electrically powered means including means for selecting tape segments to be measured and dispensed, means for energizing said power means to effect tape measuring and dispensing, means for deenergizing said power means as measuring of the selected tape segment is completed, and means for briefly electrically reenergizing said electrically powered means to actuate said tape strip severing mechanism.

11. An automatic tape measuring and dispensing machine comprising, in combination, a supporting frame, a tape strip feed roller rotatably mounted thereon, an alternating current motor on said frame, means operatively connecting said motor and feed roller for drive of the latter by the former, a tape measuring and presser roller rotatably and swingably mounted on said frame, a solenoid, linkage connecting said solenoid and said measuring and presser roller for swinging movement of the latter by the former to bring the said latter into engagement with said feed roller, a measuring cam rotatably mounted and connected to said presser roller for rotation therewith, and an electrical control system for sequentially energizing and deenergizing said motor and solenoid, said control mechanism including manually operable tape segment selector means automatically operable, means responsive to said tape segment selector means for energizing said motor and solenoid to effect tape measuring and feeding, and automatically operable means responsive to said measuring cam for deenergizing said motor and solenoid upon completion of tape measurement to stop tape feeding.

12. An automatic tape measuring and dispensing machine comprising, in combination, a supporting frame, a tape strip feed roller rotatably mounted thereon, a motor on said frame, means operatively connecting said motor and feed roller for drive of the latter by the former, a tape measuring and presser roller rotatably and swingably mounted on said frame, a solenoid, linkage connecting said solenoid and said measuring and presser roller for swinging movement of the latter by the former to bring the said latter into engagement with said feed roller, a measuring cam rotatably mounted and connected to said measuring and presser roller for rotation therewith, and an electrical control system for sequentially energizing and deenergizing said motor and solenoid, said control mechanism including tape segment selector means incorporating a manually operable spring return dial unit, motor and solenoid circuits automatically energized and deenergized therethrough to measure and dispense tape, and a circuit actuated by said measuring cam for effecting deenergization of said motor and solenoid circuits upon completion of the measuring of the selected tape segment.

References Cited in the file of this patent

UNITED STATES PATENTS

| | | |
|---|---|---|
| 1,271,603 | Mortimer | July 9, 1918 |
| 1,732,635 | Chabot | Oct. 22, 1929 |
| 1,732,636 | Gautier et al. | Oct. 22, 1929 |
| 1,960,945 | Krueger | May 29, 1934 |
| 2,258,912 | Steen et al. | Oct. 14, 1941 |
| 2,324,987 | Secrest | July 20, 1943 |
| 2,339,194 | Reichelt | Jan. 11, 1944 |
| 2,408,363 | Beckman | Oct. 1, 1946 |
| 2,417,593 | Farrow | Mar. 18, 1947 |
| 2,468,772 | Mungall | May 3, 1949 |
| 2,601,159 | Marsh | June 17, 1952 |
| 2,629,440 | Shaw et al. | Feb. 24, 1953 |